(12) United States Patent
Wernet et al.

(10) Patent No.: US 8,746,059 B2
(45) Date of Patent: Jun. 10, 2014

(54) APPARATUS FOR DETERMINING AND/OR MONITORING A PROCESS VARIABLE

(75) Inventors: Armin Wernet, Rheinfelden (DE); Roland Dieterle, Lörrach (DE); Andreas Krumbholz, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 739 days.

(21) Appl. No.: 12/449,305

(22) PCT Filed: Feb. 13, 2008

(86) PCT No.: PCT/EP2008/051701
§ 371 (c)(1),
(2), (4) Date: Mar. 19, 2010

(87) PCT Pub. No.: WO2008/098948
PCT Pub. Date: Aug. 21, 2008

(65) Prior Publication Data
US 2010/0194383 A1     Aug. 5, 2010

(30) Foreign Application Priority Data

Feb. 16, 2007 (DE) .......................... 10 2007 008 358

(51) Int. Cl.
*G01F 23/00* (2006.01)
(52) U.S. Cl.
USPC ........................................................ 73/304 R
(58) Field of Classification Search
USPC ........................................................ 73/304 R
See application file for complete search history.

(56) References Cited

U.S. PATENT DOCUMENTS

| 3,119,266 A |   | 1/1964  | Atkinson              |
|-------------|---|---------|-----------------------|
| 3,879,644 A | * | 4/1975  | Maltby ......... 361/272 |
| 3,993,947 A | * | 11/1976 | Maltby et al. .... 324/610 |
| 4,518,477 A | * | 5/1985  | Wright et al. ..... 204/415 |
| 4,573,040 A | * | 2/1986  | Maltby et al. .... 340/511 |
| 5,341,673 A | * | 8/1994  | Burns et al. ......... 73/73 |
| 5,546,005 A |   | 8/1996  | Rauchwerger           |

FOREIGN PATENT DOCUMENTS

| DE | 28 19 731        | 12/1979 |
| DE | 42 17 305 A1     | 12/1993 |
| DE | 69402986         | 11/1997 |
| DE | 197 57 190 A1    | 6/1999  |
| DE | 10 2004 050 495 A1 | 4/2006 |
| EP | 0 101 580 B1     | 2/1984  |
| EP | 0 621 466 A1     | 10/1994 |
| EP | 0 711 405 B1     | 5/1996  |

* cited by examiner

*Primary Examiner* — Hezron E Williams
*Assistant Examiner* — Rodney T Frank
(74) *Attorney, Agent, or Firm* — Bacon & Thomas, PLLC

(57) ABSTRACT

An apparatus for determining and/or monitoring at least one process variable of a medium. The apparatus includes: at least one probe unit; and at least one electronics unit, which supplies the probe unit with an operating signal and which receives from the probe unit a received signal. The probe unit includes at least one probe electrode and at least one guard electrode; and the probe electrode and the guard electrode are surrounded, at least partially, by at least one insulating unit. The the insulating unit has, in the region of the guard electrode, a smaller thickness than in the region of the probe electrode.

12 Claims, 4 Drawing Sheets

APPARATUS FOR DETERMINING AND/OR MONITORING A PROCESS VARIABLE

TECHNICAL FIELD

The invention relates to an apparatus for determining and/or monitoring at least one process variable of a medium. The apparatus includes: At least one probe unit; and at least one electronics unit, which supplies the probe unit with an operating signal and which receives a received signal from the probe unit; wherein the probe unit has at least one probe electrode and at least one guard electrode and wherein the probe electrode and the guard electrode are surrounded, at least partially, by at least one insulating unit. The process variable is, for example, fill level of the medium in a container. The medium is, for example, a liquid or a bulk good, or, in general, a fluid.

BACKGROUND DISCUSSION

In modern process and automation technology, it is known, for example, to measure fill level via the capacitive measuring principle. In such case, a probe unit and the wall of the container, or a second probe unit, form, in combination with the medium as dielectric, a capacitor. The capacitance of this capacitor depends on the fill level of the medium. Thus, it is possible, based on the measured capacitance of the capacitor, to ascertain, or monitor, as the case may be, fill level. A problem, in this connection, is presented by the fact that the medium comes in contact with the probe unit, and, thus, can adhere to the probe unit. In the presence of such accretion, measuring, or monitoring, of fill level is generally no longer possible. In view of this, for example, probe units are used, which include a probe electrode and at least one guard electrode. The guard electrodes are, in such case, most often, supplied with the same signal as the probe electrode, so that the two electrodes lie at the same electrical potential. Such guard electrodes are, above all, advantageous, when accretion of medium leads to a connection between the probe and the container wall. The electric field occurring as a result of the guard electrode effectively prevents electrical current flow from the probe electrode through the accretion to the container wall. Especially in the case of conductive, adhering media, it is necessary to work with such a guard electrode, in order to have a safer, measured value. The better the electrical coupling of the guard electrode to the adhering medium, the better is the guard effect. From this, it follows that a bare guard electrode would best fulfill the function. In the case of applications, where the medium is food, it is, however, for hygienic reasons, required, that a "gap-free construction" be assured. In such case, a probe unit with bare guard electrode and insulated probe electrode (this prevents direct electrical contact between probe and medium) is unavoidably associated with a gap, since, here, the material pairing of metal and plastic excludes the possibility of materially bonded connection. A completely insulated arrangement, in the case of which the insulation surrounds both the probe electrode and the guard electrode, does not have this disadvantage of the missing gap-free connection.

For a high accretion insensitivity with a gap-free, fully insulated probe unit, thus, there are the following requirements for the application of the guard electrode: The thickness of the insulation in the region of the guard electrode should be as small as possible; furthermore, the DK value— thus, the value of the dielectric constant of the insulation in the same region—should be as high as possible, because the value of the impedance between the guard electrode and the surroundings should be as small as possible.

SUMMARY OF THE INVENTION

An object of the invention, therefore, is to provide an apparatus for determining and/or monitoring at least one process variable, which permits, via capacitive measurements, a breadth of application, which is a great as possible.

The invention solves the object by the feature that the insulating unit has in the region of the guard electrode a smaller thickness than in the region of the probe electrode. The insulation is thus thinner around the guard electrode than in the region of the probe electrode.

An embodiment includes, that the insulating unit surrounds at least one end region of the probe electrode. Especially, the medium-contacting region of the probe electrode is surrounded. Furthermore, the transition between the guard electrode and the probe electrode is surrounded gap-freely.

An embodiment provides, that the probe unit is, at least sectionally, rod-shaped.

An embodiment includes, that the guard electrode and/or the probe electrode are, at least sectionally, cylindrical.

An embodiment provides, that the guard electrode has a greater circumference and/or a greater diameter and/or a larger surface area than the probe electrode. In most cases, the guard electrode is shorter than the probe electrode.

An embodiment includes, that at least one isolating unit is provided, which isolates the guard electrode and the probe electrode electrically from one another. The isolating unit is especially arranged spatially between the guard electrode and the probe electrode.

An embodiment includes, that the isolating unit is, at least sectionally, cylindrical.

An embodiment provides, that the isolating unit narrows, at least sectionally, conically. The tip of the cone points especially in the direction of the probe electrode.

An embodiment includes, that the guard electrode, at least sectionally, coaxially surrounds the probe electrode.

An embodiment provides that the insulating unit has an essentially constant outer diameter.

An embodiment includes, that the insulating unit has a greater outer diameter in the region of the guard electrode than in the region of the probe electrode.

An embodiment includes, that the insulating unit has in the region of the guard electrode an essentially different DK value than in the region of the probe electrode. The DK values of the insulating unit are sectionally different.

An embodiment provides, that the insulating unit is, at least sectionally, tubular.

An embodiment includes, that the process variable is fill level.

An embodiment provides that the operating signal is an electrical, alternating voltage of predeterminable frequency.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
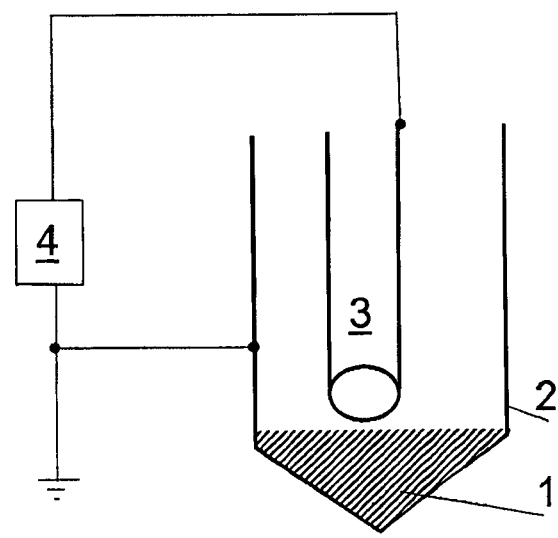
FIG. 1 is a construction, in principle, for capacitive measuring, or monitoring, of fill level of a medium in a container.

The FIG. 1 shows construction, in principle, for a capacitive measuring of fill level of a medium 1 in a container 2. Introduced into the container 2 is the probe unit 3, which, in such case, comes in contact with the medium 1 as its fill level rises in the container. Connected with the probe unit 3 is the electronics unit 4, which supplies the probe unit 3 with the operating signal. In most cases, the operating signal is an electrical, alternating voltage of predeterminable frequency. The electronics unit 4 receives from the probe unit 3 a received signal. Usually, the received signal is an electrical, alternating current, which, most often, is converted via an ohmic resistance element into an electrical, alternating voltage. This alternating voltage is, for example, digitized in the electronics unit 4 and then suitably evaluated as regards fill level. The capacitive measuring principle starts on the basis that the probe unit 2 and, in this example, the wall of the container 2 form, in combination with the medium 1, which serves as dielectric, an electrical capacitor. The capacitance of this capacitor depends on the fill level of the medium 1, so that, by measuring the capacitance, the fill level of the medium 1 can be deduced via suitably stored, calibration data. In the case of conductive media, the probe unit 3 is insulated, and the medium 1 lies at the same electrical potential as the wall of the container 2. Serving as dielectric of the capacitor is then the insulation of the probe unit 3. The capacitance of the arrangement, or of the capacitor, changes, in such case, as a function of the fraction of the surface of the insulation surrounded by the medium.

Figure 2:
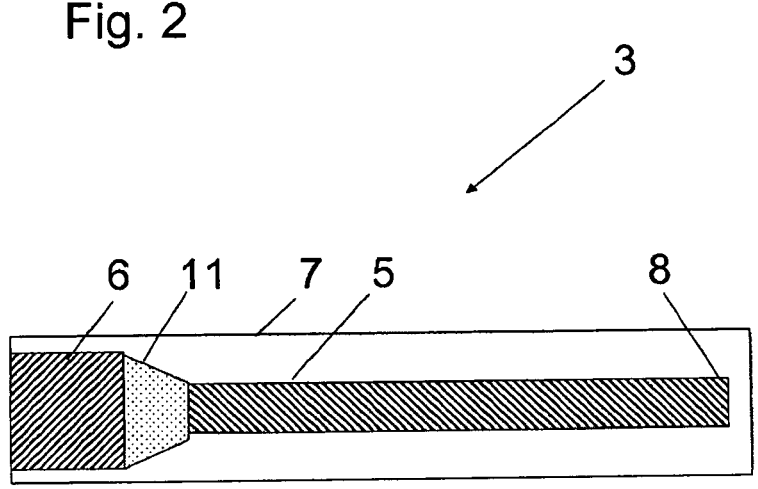
FIG. 2 is a section through a first embodiment of a probe unit of the invention.

FIG. 2 shows a section through a probe unit 3. The probe electrode 5 is, in such case, rod-shaped and is, at least sectionally, coaxially surrounded by the guard electrode 6. Especially, the probe electrode 5 has a greater length than the guard electrode 6. I.e., the probe unit 3 ends with the probe electrode 5 and only at the beginning of the probe unit 3, i.e. in the vicinity of its securement, does the guard electrode 6 surround the probe electrode 5. The probe electrode 5 and the guard electrode 6 are, in such case, essentially cylindrical, with the diameter of the probe electrode 5 being smaller than the diameter of the guard electrode 6. The guard electrode 6 and the probe electrode 5 are surrounded by the insulating unit 7, which has, in the region of the guard electrode 6, a smaller thickness than in the region of the probe electrode 5. The insulation around the guard electrode 6 is, thus, thinner than it is around the probe electrode 5. This embodiment can be achieved, for example, by providing cavities internally in the insulating unit 7, with the diameter of the cavity in the end region of the insulating unit 7 being smaller than in the beginning region. Located between the guard electrode 6 and the probe electrode 5 is an isolating unit 11. Such is, for example, a plastic unit, which insulates the two electrodes 5, 6 electrically from one another. As here and in the following figures, the insulating unit 7 is externally, thus in the direction of the medium, one-piece and, especially, gap-free. The insulating unit 7 surrounds, especially, the end region 8 of the probe electrode 5 facing the medium completely and serves, thus, for a complete electrical insulation of the probe electrode 5. The probe unit 3 is, thus, completely and especially gap-freely surrounded by the insulating unit 7.

Figure 3:
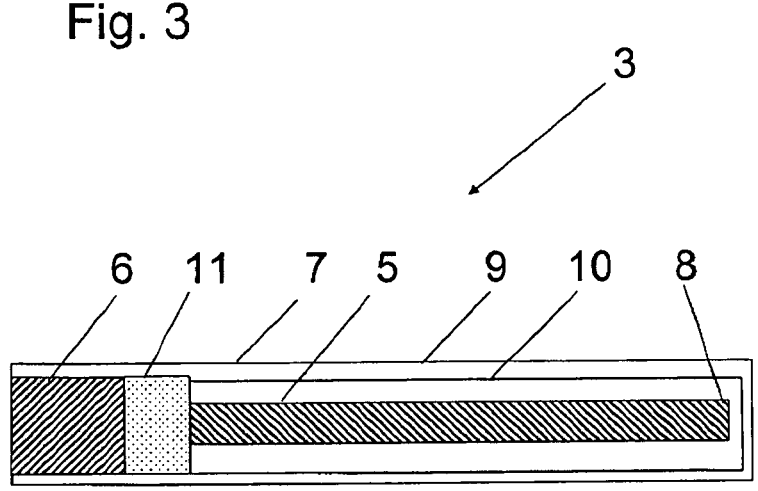
FIG. 3 is a section through a second embodiment of a probe unit of the invention.

FIG. 3 shows a section through a rotationally symmetric probe unit 3 such as also shown in FIG. 2. The insulation unit 7 is composed here of two insulating portions 9 and 10, wherein the second insulating unit 10 surrounds only the probe electrode 5, while the first insulation 9 surrounds both the second insulation 10 and also the guard electrode 6. Thus, also the effect can be achieved, that the insulation in the region of the probe electrode 5 has a greater thickness than in the region of the guard electrode 6. In an embodiment, the two insulating units 9, 10 are tubes. In an additional embodiment the insulating units 9, 10 are powder coated layers. In an additional embodiment, different materials are used for the insulation, depending on the section, which the insulation encases. To the outside, however, also here, the insulating unit 7 is gap-free.

Figure 4:
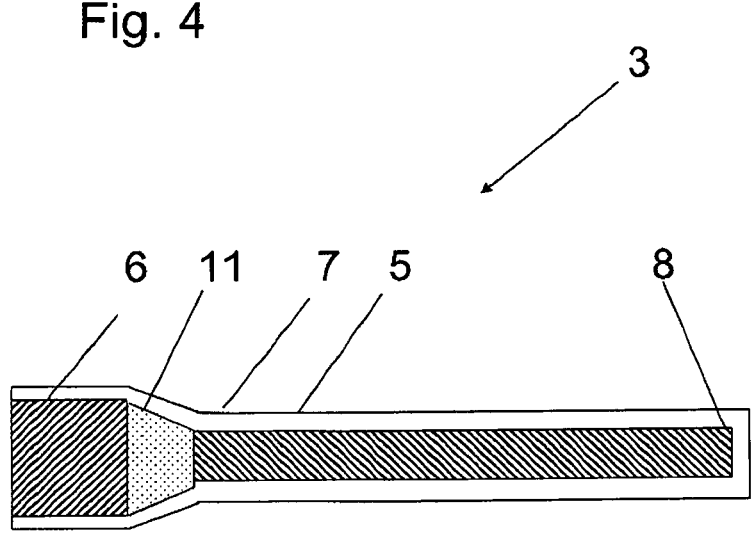
FIG. 4 is a section through a third embodiment of a probe unit of the invention.

In FIG. 4, another embodiment of the insulation is achieved by stretching the insulating unit 7 over the guard electrode in such a manner, that it has a smaller wall thickness there. The insulating unit 7 is, thus, thin around the guard electrode 6. At the same time, the outer diameter of the insulating unit 7 is not essentially constant, such as in FIGS. 2 and 3, but, instead sectionally differs.

LIST OF REFERENCE CHARACTERS

TABLE 1

| | |
|---|---|
| 1 | medium |
| 2 | container |
| 3 | probe unit |
| 4 | electronics unit |
| 5 | probe electrode |
| 6 | guard electrode |
| 7 | insulating unit |
| 8 | end region of the probe electrode |
| 9 | first insulating portion |
| 10 | second insulating portion |
| 11 | isolating unit |

The invention claimed is:

1. An apparatus for determining and/or monitoring at least one process variable of a medium, comprising:
   at least one probe unit, said probe unit includes a probe electrode and a guard electrode;
   at least one electronics unit, which supplies said probe unit with an operating signal and which receives from said probe unit a received signal; and
   at least one insulating unit, which insulates said guard electrode and probe electrode electrically from one another,
   wherein:
   said guard electrode surrounds said probe electrode, at least in sections, coaxially;
   said probe electrode has a greater length than said guard electrode:
   said probe unit ends with said probe electrode:
   said guard electrode surrounds said probe electrode only at the beginning of said probe unit;
   said probe electrode and said guard electrode are completely surrounded, by said insulating unit; and
   said insulating unit has, in the region of said electrode, a smaller thickness than in the region of said probe electrode.

2. The apparatus as claimed in claim 1, wherein:
   said insulating unit surrounds at least an end region of said probe electrode.

3. The apparatus as claimed in claim 1, wherein:
   said probe unit is, at least sectionally, rod-shaped.

4. The apparatus as claimed in claim 1, wherein:
   said guard electrode and/or said probe electrode are/is, at least sectionally, cylindrical.

5. The apparatus as claimed in claim 1, wherein:
said guard electrode has a greater circumference and/or a greater diameter and/or a larger surface area than said probe electrode.

6. The apparatus as claimed in claim 1, wherein:
said isolating unit is, at least sectionally, cylindrical.

7. The apparatus as claimed in claim 1, wherein:
said insulating unit has an essentially constant outer diameter.

8. The apparatus as claimed in claim 1, wherein:
said insulating unit has, in the region of said guard electrode, a greater outer diameter than in the region of said probe electrode.

9. The apparatus as claimed in claim 1, wherein:
said insulating unit has, in the region of said guard electrode, an essentially different DK value than in the region of said probe electrode.

10. The apparatus as claimed in claim 1, wherein:
said insulating unit is, at least sectionally, tubular.

11. The apparatus as claimed in claim 1, wherein:
the process variable is fill level.

12. The apparatus as claimed in claim 1, wherein:
the operating signal is an electrical alternating voltage of predeterminable frequency.

* * * * *